US006270926B1

(12) United States Patent
Yamashita et al.

(10) Patent No.: US 6,270,926 B1
(45) Date of Patent: *Aug. 7, 2001

(54) LITHIUM SECONDARY BATTERY

(75) Inventors: Yasuhisa Yamashita; Koji Hattori, both of Shiga-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/004,104

(22) Filed: Jan. 7, 1998

Related U.S. Application Data

(63) Continuation-in-part of application No. 08/895,319, filed on Jul. 16, 1997.

(30) Foreign Application Priority Data

| Jul. 16, 1996 | (JP) | 8-206661 |
| Aug. 29, 1996 | (JP) | 8-248673 |
| Jan. 7, 1997 | (JP) | 9-013091 |
| Dec. 10, 1997 | (JP) | 9-362089 |

(51) Int. Cl.⁷ .................................................. H01M 4/58
(52) U.S. Cl. .................. 429/231.1; 429/224; 429/223; 429/221; 429/231.5; 429/231.6; 429/218.1; 429/304
(58) Field of Search .................................. 429/224, 304, 429/218.1, 221, 223, 231.5, 231.6, 231.1

(56) References Cited

U.S. PATENT DOCUMENTS

| 4,567,031 | 1/1986 | Riley ..................................... 423/593 |
| 5,081,102 | 1/1992 | Gay et al. ............................... 505/1 |
| 5,110,696 | 5/1992 | Shokoohi et al. .................... 429/218 |
| 5,122,505 | 6/1992 | Gusman et al. .......................... 505/1 |
| 5,135,732 * | 8/1992 | Barboux et al. ....................... 423/593 |
| 5,177,055 | 1/1993 | Kinsman et al. ........................ 505/1 |
| 5,264,201 | 11/1993 | Dahn et al. ............................. 423/594 |
| 5,370,948 | 12/1994 | Hasegawa et al. .................... 429/223 |
| 5,449,577 | 9/1995 | Dahn et al. ............................. 429/94 |

(List continued on next page.)

FOREIGN PATENT DOCUMENTS

| 0582448A1 | 2/1994 | (EP) . |
| 0709906A1 | 5/1996 | (EP) . |
| 0820113A1 | 1/1998 | (EP) . |
| 6333562 | 12/1994 | (JP) . |
| 07006764 | 1/1995 | (JP) . |
| 8069790 | 3/1996 | (JP) . |
| 08321300 | 12/1996 | (JP) . |
| WO94/25398 | 11/1994 | (WO) . |
| 9534919 | 12/1995 | (WO) . |
| 9612676 | 5/1996 | (WO) . |

OTHER PUBLICATIONS

"Preparation of Spherical $LiCoO_2$ Powders by the Ultrasonic Spray Decomposition and Its Application to Cathode Active Material in Lithium Secondary Battery"; Takashi Ogihara, et al.; *Journal of the Ceramic Society of Japan*; International Edition; 101 (1993) Oct.; No. 10; pp. 1128–1132.

"Electrochemistry and Structural Chemistry of $LiNiO_2$ (R3) for 4 Volt Secondary Lithium Cells"; Tsutomu Ohzuku, et al.; *J. Electrochem. Soc.*; vol. 140, No. 7, Jul. 1993; pp. 1862–1870.

*Primary Examiner*—Laura Weiner
(74) *Attorney, Agent, or Firm*—Ostrolenk, Faber, Gerb & Soffen, LLP

(57) ABSTRACT

A lithium secondary battery includes an anode, a cathode and a separator containing non-aqueous electrolytic solution or solid-state electrolyte, interposed between the anode and the cathode. The anode comprises, as an active material, lithium metal, lithium alloy or a material capable of absorbing and desorbing lithium ions. The cathode comprises spinel-structured lithium-manganese complex oxide as an active material. The spinel-structured lithium-manganese complex oxide is in the form of hollow spherical particles formed by sintering single crystal particles.

16 Claims, 3 Drawing Sheets

U.S. PATENT DOCUMENTS

| | | | |
|---|---|---|---|
| 5,490,320 | 2/1996 | Hasegawa et al. | 29/623.1 |
| 5,496,664 | 3/1996 | Sterr | 429/224 |
| 5,589,300 | 12/1996 | Fauteux et al. | 429/218 |
| 5,599,642 | 2/1997 | Toshiro et al. | 429/194 |
| 5,626,635 | 5/1997 | Yamaura et al. | 29/623.5 |
| 5,629,110 | 5/1997 | Kobayashi et al. | 429/223 |
| 5,648,057 | 7/1997 | Ueda et al. | 423/594 |
| 5,683,835 * | 11/1997 | Bruce | 429/224 |
| 5,700,442 | 12/1997 | Bloch et al. | 423/599 |
| 5,700,597 * | 12/1997 | Zhong et al. | 429/218.1 |
| 5,702,679 | 12/1997 | Sheargold et al. | 423/599 |
| 5,702,845 * | 12/1997 | Kawakami et al. | 429/224 |
| 5,705,296 | 1/1998 | Kamauchi et al. | 429/218.1 |
| 5,718,877 | 2/1998 | Manev et al. | 423/599 |
| 5,742,070 | 4/1998 | Hayashi et al. | 252/182.1 |
| 5,789,115 * | 8/1998 | Manev et al. | 429/224 |
| 5,792,442 | 8/1998 | Manev et al. | 423/599 |
| 5,807,646 * | 9/1998 | Iwata et al. | 429/224 |

* cited by examiner

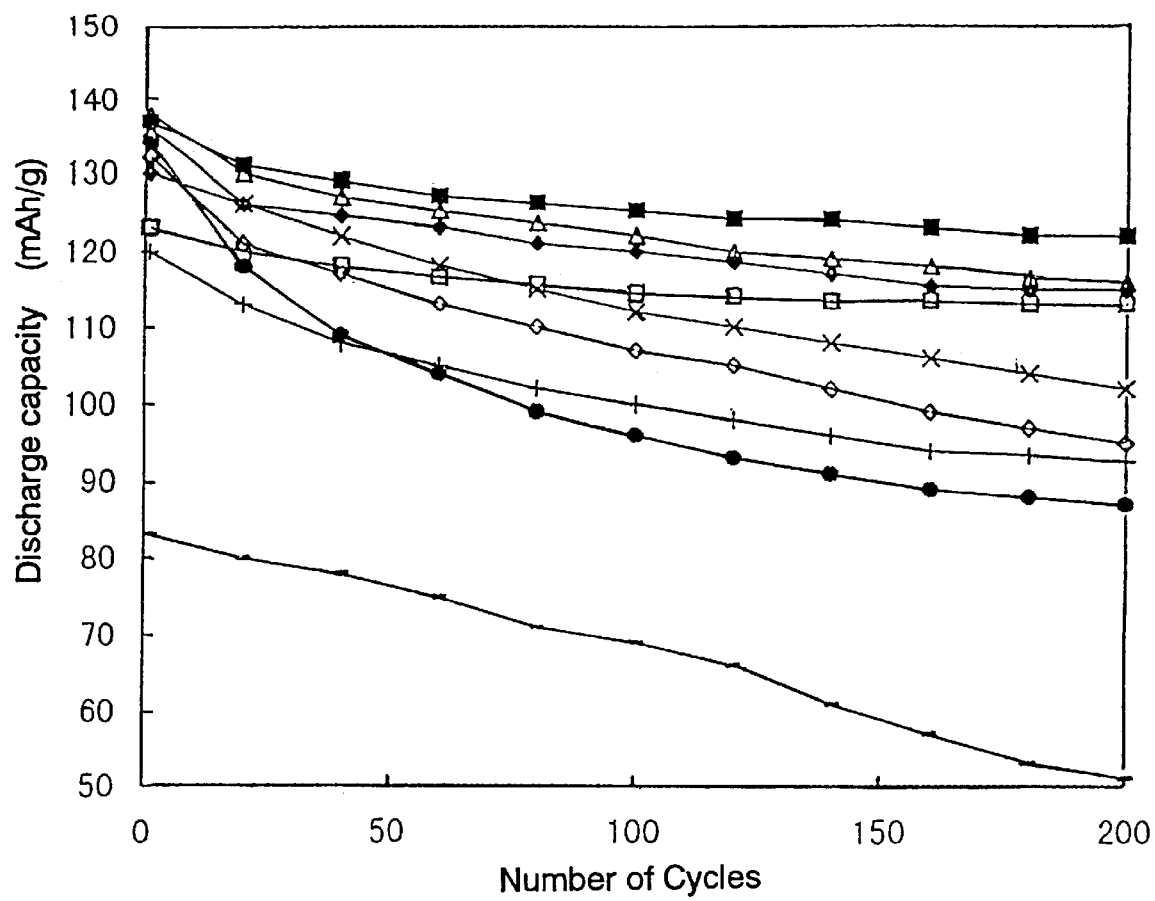

LITHIUM SECONDARY BATTERY

This is a continuation-in-part of application Ser. No. 08/895,319, filed Jul. 16, 1997, which is hereby incorporated by reference herein.

BACKGROUND OF THE INVENTION

1. Field of the Invention

The present invention relates to lithium secondary batteries employing spinel-structured lithium-manganese complex oxide as the cathode active material thereof.

2. Description of the Related Art

In the recent years, there has been accelerated development of down-sized and cordless design schemes in the field of electronics apparatus or equipment. In view of this trend, secondary batteries are of increasing interest since these have increased applicability as the power supply for such electronic equipment due to their capability of size reduction and high electrical energy density. The 4-V class lithium secondary batteries of the non-aqueous electrolytic solution type have been commercialized as secondary batteries satisfying the needs of the new equipment.

A lithium secondary battery generally includes (a) an cathode having a lithium-containing compound as the active material, (b) an anode having a material capable of absorbing and desorbing lithium, such as a carbon material, or lithium metal as the active material and (c) a separator containing a non-aqueous electrolytic solution or a solid electrolyte. The lithium-containing compound used as the active material of the cathode may include, for example, $LiCoO_2$, $LiNiO_2$ and $LiMn_2O_4$. Recently, attention has been drawn to the spinel-structured lithium-manganese complex oxides, such as $LiMn_2O_4$, as the natural resource for the complex oxide because it is expected to exist in a large enough quantity to be inexpensive and provide a stable supply. Accordingly, various lithium secondary batteries comprising the complex oxide as an active material of the cathode has been proposed.

For example, Japanese Laid-Open Patent Application No. 6-333562 discloses a lithium secondary battery comprising an $LiMn_2O_4$ type compound as the cathode active material, in which the compound is in the form of spherical particles having uniformly roughened surfaces and having a median diameter of from 0.5 to 0.6 $\mu$m while being distributed within a particle size range of 0.1 to 1.1 $\mu$m. Japanese Laid-Open Patent Application No. 8-69790 discloses a lithium secondary battery comprising a lithium-manganese complex oxide as the cathode active material, in which the complex oxide has specific surface area of from 0.05 to 5.0 $m^2/g$.

However, the conventional lithium secondary batteries comprising such a spinel-structured lithium-manganese complex oxide as the active material are not still satisfactory with respect to the battery capacity and the charge-discharge cycle characteristics.

It is therefore an object of the present invention to provide a lithium secondary battery of large battery capacity with enhanced charge-discharge cycle characteristics.

SUMMARY OF THE INVENTION

A lithium secondary battery according to the preferred embodiments of the invention include an anode, a cathode and a separator containing non-aqueous electrolytic solution or a solid-state electrolyte interposed between the anode and the cathode. The anode comprises, as an active material, lithium metal, lithium alloy or a material capable of absorbing and desorbing lithium ions. The cathode comprises a spinel-structured lithium-manganese complex oxide as active material. The spinel-structured lithium-manganese complex oxide is in the form of hollow spherical secondary particles formed by sintering single crystal primary particles.

The primary particles preferably have an average diameter of from about 20 to 500 nm and the spinel-structured lithium-manganese complex oxide is preferably represented by a general formula: $Li(Mn_{2-x}Li_x)O_4$ (where $0 \leq x \leq 0.1$).

According to present invention, the complex oxide used as the cathode active material of the lithium secondary battery has the shape of hollow spherical particles having many gaps which reach to the inside of the particles. Thus, the non-aqueous electrolytic solution can penetrate the inside of the particles, and the complex oxide has a large surface area. This makes it possible to improve the utilization efficiency of the cathode active material and increase battery capacity.

In addition, since the complex oxide is stable with respect to absorption and desorption of lithium due to the high crystallinity of the primary particles, the lithium secondary battery of the invention exhibits excellent charge-discharge cycle characteristics.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWINGS

FIG. 3 is a graph showing the charge-discharge cycle characteristics of the lithium secondary battery.

DETAILED DESCRIPTION OF THE INVENTION

Figure 1:
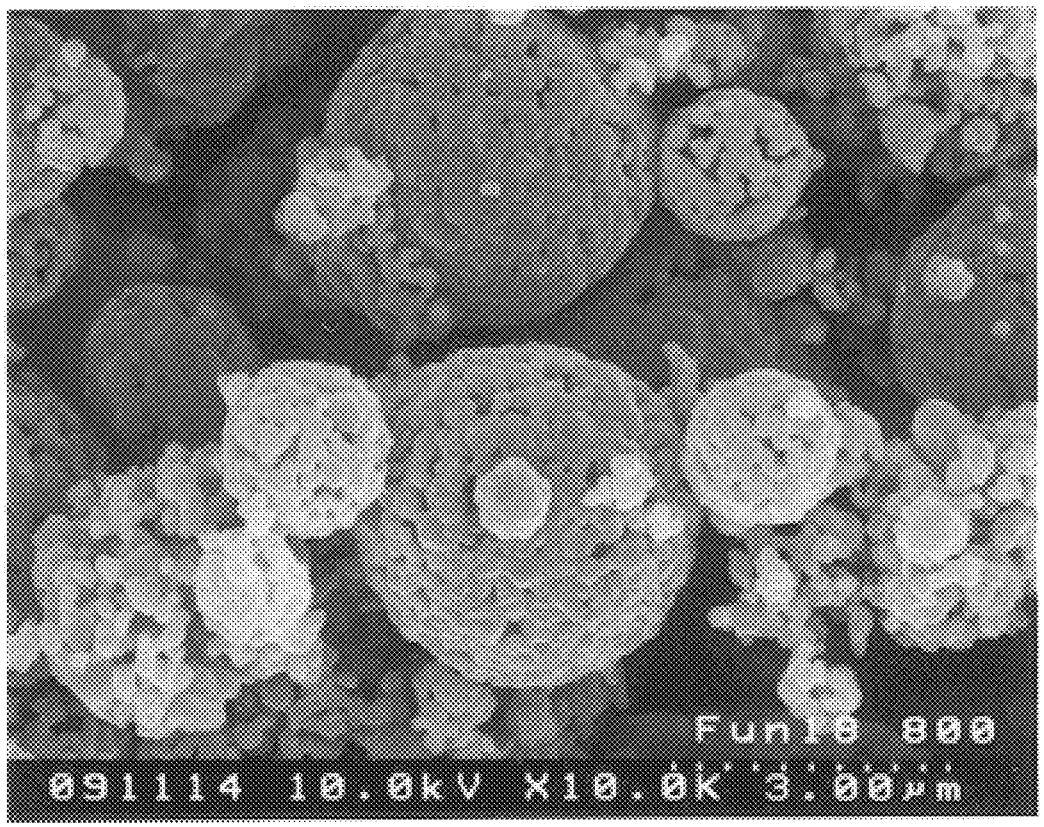
FIG. 1 is a SEM photograph of the cathode active material of a lithium secondary battery in accordance with the present invention.

Hereinafter, the preferred embodiments of the present invention are explained in detail with reference to the drawings.

A lithium secondary battery in accordance with a preferred embodiment of the present invention includes a cathode, an anode and a separator containing a non-aqueous electrolytic solution or a solid electrolyte.

The cathode comprises a spinel-structured lithium-manganese complex oxide as an active material. Specifically, the complex oxide comprises a hollow spherical secondary particle formed by sintering single crystalline primary particles. According to the complex oxide, the particles of the spinel-structured lithium-manganese complex oxide have many gaps which reach to the inside of the particles so that the non-aqueous electrolytic solution can penetrate the inside of the particles. Thus, the complex oxide has a large area which can be in contact with the non-aqueous electrolytic solution, thereby improving the utilization efficiency of the cathode active material.

The primary particles preferably have an average diameter of from about 70 to 500 nm. The primary particles having the diameter in this range can form the secondary articles having a relatively large diameter. This allows the cathode active material comprising the complex oxide to be well shaped while the cathode active material has the sufficient specific surface area. Even if the amount of a binder which is added to the cathode active material is reduced, the material still can be shaped into a cathode having an increased energy density per the unit volume. Further, since the primary particles forming the secondary particles are single crystals having a uniform composition, the complex oxide has great stability against absorption and desorption of the lithium. Thus, the lithium secondary battery of the invention exhibits an excellent charge-discharge cycle characteristics.

The spinel-structured lithium-manganese complex oxide is preferably represented by the general formula $Li(Mn_{2-x}Li_x)O_4$ (where $0 \leq x \leq 0.1$) for obtaining a good energy efficiency and charge-discharge cycle characteristics.

The active material for the anode may be lithium metal, lithium alloy or a material (carbon or the like) which is capable of absorbing and desorbing lithium ions.

The non-aqueous electrolytic solution may be a solution prepared by dissolving an electrolyte of a lithium salt, such as $LiPF_6$, $LiClO_4$, $LiBF_4$, $LiAsF_6$ or the like, in a mixed solvent comprising propylene carbonate or ethylene carbonate, and diethoxyethane or dimethoxyetane.

The separator may be porous polypropylene films or non-woven cloth. Further, a solid electrolyte may alternatively be employed in place of the separator impregnated with non-aqueous electrolytic solution.

(Embodiment 1)

First, lithium nitrate and manganese formate were prepared as the compounds of the metal elements constituting the lithium-manganese complex oxide. Then, the lithium nitrate and manganese formate were put into a vessel after accurate measurement such that the molar ratio of lithium (Li) to manganese (Mn) is equal to 1.02:1.98, ensuring that a lithium-manganese complex oxide represented by $Li(Mn_{1.98}Li_{0.02})O_4$ is obtainable. After adding a mixed solvent consisting of water and alcohol at the ratio of 1:1 (volume ratio) into the vessel, the resulting material was stirred to give a solution. The solvent may be either water or alcohol as long as the lithium nitrate and manganese formate can be dissolved in the solvent.

Next, the resulting solution was turned into a mist using an ultrasonic device and the mist, carried by a carrier gas, was introduced into the interior of a vertical thermal decomposition furnace at adjusted temperature of 600 to 800° C., whereby a complex oxide powder was obtained. Thereafter, the resultant complex oxide powder was put into a sagger of alumina and sintered at about 720 for 24 hours so that the complex oxide of $Li(Mn_{1.98}Li_{0.02})O_4$ was obtained. This is Sample 1 in Table 1.

Subsequently, the resulting complex oxide powder was subject to particle shape verification using scanning electron microscope (SEM) equipment and also to analysis by X-ray diffraction (XRD) techniques. While the X-ray diffraction pattern (not shown) was slightly shifted toward the wide angle side, it was the diffraction pattern of a cubic-crystalline spinel-structured $LiMn_2O_4$, and no other diffraction patterns (impurities) were observed. It was also seen that the crystal diameter or size as determined by calculation based on Scheie's Equation was 95.3 nm which is almost identical in value to the size of the primary particles as found in the SEM photograph shown in FIG. 1. It is confirmed that the primary particles consist of single crystals by the fact that no crystalline boundaries were found by SEM observation. Furthermore, it can be seen from FIG. 1 that the resulting complex oxide is such that a group of primary particles make up hollow spherical secondary particles with much spacing or gaps therein. A number of gaps penetrate into the inside space reside in the surface of such hollow spherical secondary particles.

Next, other complex oxide powder samples labeled as Samples 2 to 7 which are different from one another in crystalline size were obtained in a similar way to that of the powder Sample 1 except for adjustment of the temperature for the spray pyrolysis and the sintering temperature. SEM equipment was again used to affirm resultant particle shapes while analyzing by X-ray diffraction techniques for measurement of respective crystalline diameters.

Thereafter, secondary batteries were manufactured with resultant complex oxides as cathode active materials thereof.

More specifically, 100 parts by weight of the complex oxide, 5 parts by weight of acetylene black as conductive agent and 5 parts by weight of polyethylene tetrafluoride serving as binder were kneaded and shaped into sheets. Each of the sheets was attached under pressure to a 17 mm-diameter disc of a SUS mesh to form a cathode 3.

Figure 2:
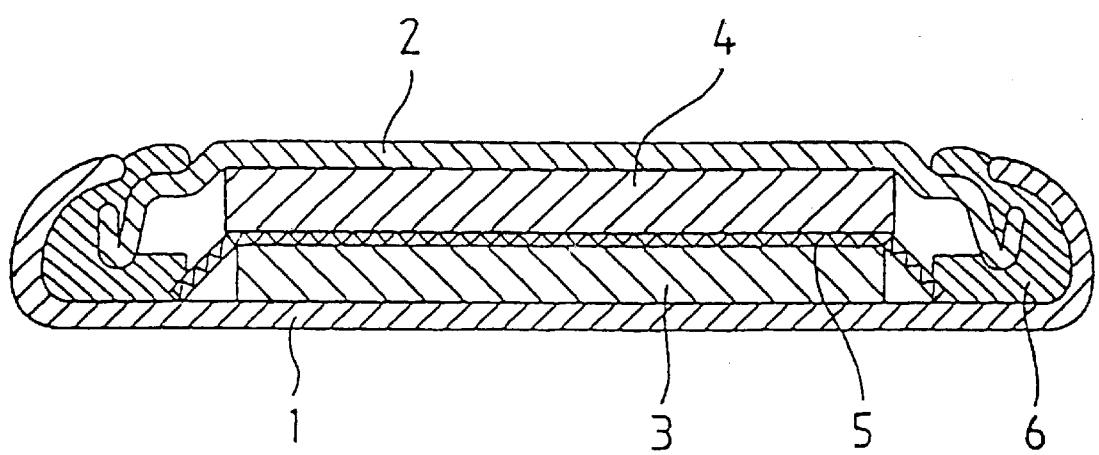
FIG. 2 is a cross sectional view of one embodiment of the lithium secondary battery of the invention.

Thereafter, as shown in FIG. 2, an anode 4 of lithium metal (diameter: 17 mm, thickness: 0.2 mm) was stacked on the cathode 3 via a polypropylene separator 5 in such a way that the SUS mesh of the cathode 3 faces outward, and the stacked anode 4 and cathode 3 were held in a cathode cell 1 so that the cathode 3 faces downward. Then, an electrolytic solution was infiltrated into the separator 5. As the electrolytic solution, used herein was a solution prepared by dissolving $LiPF_6$ in an equal-volume mixture solvent of ethylene carbonate and dimethyl carbonate at 1 mol/l. Thereafter, the opening of cathode cell 1 was sealed by a anode plate 2 made of stainless steel with a dielectric packing member 6 being sandwiched therebetween, thereby obtaining a lithium secondary battery.

Next, the lithium secondary battery thus obtained was subject to a charging-discharging test of 200 cycles under the conditions that the charge-discharge current density was 1.0 mA/cm$^2$, the maximum charge voltage was 4.3 V and the cut off discharge voltage was 3.0 V. The test results are shown in FIG. 3. It is to be noted that the sample numbers used in FIG. 3 corresponds to those of the complex oxide powder employed as respective cathode active materials.

(Comparison 1)

Lithium nitrate and electrolytic manganese dioxide were prepared as compounds of the metal elements constituting the lithium-manganese complex oxide. The lithium nitrate and electrolytic manganese dioxide were put into a vessel after accurate measurement in a way such that the molar ratio of Li to Mn is 1.02:1.98 to ensure that a lithium-manganese complex oxide represented as $Li(Mn_{1.98}Li_{0.02})O_4$ is attainable. After ball mill crushing or disintegration is carried out using alcohol as a solvent and PSZ as its cobble stone for 30 hours, the solvent was removed by evaporation so that substantive material powder was obtained.

Next, the powder was put in a sagger made of alumina and sintered at 600° C. for 48 hours so as to allow the lithium to be melted and permeated into electrolytic manganese dioxide, thereby obtaining the complex oxide.

Subsequently, the complex oxide powder was subject to particle shape verification using scanning electron microscope (SEM) equipment and also to analysis by X-ray diffraction (XRD) techniques. While the X-ray diffraction pattern (not shown) was slightly shifted to the wide angle side, it was identical to the diffraction pattern of cubic-crystalline spinel-structured $LiMn_2O_4$, and no other diffraction patterns (impurities) were observed. It was also seen that the crystalline diameter as determined by calculation based on Scheie's Equation was 42.6 nm which is different from the size of primary particles as verified using SEM equipment. This means that the primary particles consist of polycrystals. Additionally, experimentation using SEM reveals that the particle shape is massive.

The secondary battery thus obtained was manufactured in a way similar to that of the illustrative embodiment and then subject to charge-discharge test. The test results are shown in FIG. 3.

(Comparison 2)

Lithium carbonate and manganese carbonate were prepared as the compounds of the metal elements constituting the lithium-manganese complex oxide. The lithium carbonate and manganese carbonate were put into a vessel after accurate measurement in such a way that the Li-to-Mn molar ratio is 1.02:1.98 to ensure that an intended lithium-manganese complex oxide represented by $Li(Mn_{1.98}Li_{0.02})O_4$ is obtainable. After ball mill crushing or disintegration is performed using alcohol as a solvent and PSZ as its cobble stone for 30 hours, the solvent was then removed by evaporation so that substantive material powder was obtained.

This powder was then put into a sagger made of alumina and sintered at 900° C. for 48 hours. The obtained complex oxide was milled for 30 hours with a ball mill and dried to obtain the final complex oxide.

Next, the resultant complex oxide powder was subject to verification of particle shape using scanning electron microscope (SEM) equipment and also to analysis by X-ray diffraction (XRD) techniques. While the X-ray diffraction pattern (not shown) was slightly shifted to the wide angle side, it was identical to the diffraction pattern of cubic-crystalline spinel-structured $LiMn_2O_4$, and no other diffraction patterns (impurities) were observed. It was also seen that the crystalline size as calculated from Scheie's Equation was 48.3 nm which is different from the size of primary particles as confirmed by SEM experimentation. This means that the primary particles consist of polycrystals. Additionally, the SEM experimentation also reveals that the particle shape was like mass.

Next, a secondary battery was manufactured in a way similar to that of the illustrative embodiment and then subject to the charge-discharge test. The rest results are shown in FIG. 3.

TABLE 1

| Sample No. | Particle shape | Primary particle | Crystalline diameter (nm) |
| --- | --- | --- | --- |
| 1 | Hollow spherical | Single crystal | 95.3 |
| 2 | Hollow spherical | Single crystal | 500 |
| 3 | Hollow spherical | Single crystal | 150 |
| 4 | Hollow spherical | Single crystal | 71.8 |
| 5 | Hollow spherical | Single crystal | 61.5 |
| 6 | Hollow spherical | Single crystal | 51.3 |
| 7 | Hollow spherical | Single crystal | 25.3 |
| Comp. Sample 1 | Massive | Polycrystal | 42.6 |
| Comp. Sample 2 | Massive | Polycrystal | 48.3 |

As is understood from Table 1 and FIG. 3, a lithium secondary battery having a high initial discharge capacity as compared to the prior art can be obtained by employing as the cathode active material the spinel-structured lithium-manganese complex oxide which essentially consists of hollow spherical particles obtained by sintering single crystal particles. This is because electrolytic solution may soak thoroughly into every single crystal of the complex oxide to suppress occurrence of overvoltages during charge-discharge operations.

It is also understood from FIG. 3 that a lithium secondary battery having a large battery capacity and excellent charge-discharge cycle characteristics can be obtained by setting the average crystal diameter of primary particles at about 70 to 500 nm. This is because the specific surface area of the complex oxide does not become so large as to cause decomposition of the electrolytic solution if the diameter of primary particles is greater than 70 nm. This is also because the complex oxide is stable with respect to absorption and desorption of lithium due to the high crystallinity of the primary particles. It is noted that if the primary particles become too large in average crystalline size, the primary particles may not be sintered successfully to form a hollow spherical secondary particles. The specific surface area of the complex oxide may also become too small to decrease battery capacity. Accordingly, it is preferable to set the average diameter of the primary particles at about 500 nm or less.

In contrast, Comparative Sample 1 has a small initial discharge capacity and poor charge-discharge cycle characteristics because the particles of the comparative Sample 1 is polycrystalline with poor crystallinity and has no structure which allows the electrolytic solution to soak into the inside of the complex oxide. Comparative Sample 2 also suffers from like disadvantages and lack of sample uniformity, which results in a decrease both in initial discharge capacity and in charge-discharge cycle characteristics.

It should be noted that although the foregoing illustrative embodiment was described under an assumption that the spinel-structured lithium-manganese complex oxide is $Li(Mn_{1.98}Li_{0.02})O_4$, the present invention is not limited thereto. In other words, the invention may alternatively be applicable to any spinel-structured lithium-manganese complex oxide materials with no limitation to composition. In particular, the invention may offer similar advantages upon application to those compounds that are represented by the general formula: $Li(Mn_{2-x}Li_x)O_4$ (where x is $0 \leq x \leq 0.1$ and preferably $0 < x \leq 0.02$). The invention may also attain similar expected advantages in the case where a part of Mn site of the materials given by the general formula: $Li(Mn_{2-x}Li_x)O_4$ (where x is $0 \leq x \leq 0.1$) is replaced with Cr, Ni, Fe, Co, Mg or the like. In this case, the compounds applicable to the present invention are represented by the general formula: $Li(Mn_{2-x-y}A_yLi_x)O_4$ (where $0 \leq x+y \leq 0.1$, A=Cr, Ni, Fe, Co, Mg).

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A lithium secondary battery comprising:
    an anode comprising, as active material, lithium metal, lithium alloy or a material capable of absorbing and desorbing at least lithium ions;
    a cathode comprising spinel-structured lithium-manganese complex oxide as an active material, the spinel-structured lithium-manganese complex oxide being in the form of hollow, spherical particle sinters of single crystal primary particles; and an electrolyte.

2. The lithium secondary battery according to claim 1, wherein the single crystal particles have an average diameter of from about 70 to 500 nm.

3. The lithium secondary battery according to claim 2, wherein the spinel-structured lithium-manganese complex oxide is represented by the formula $$Li(Mn_{2-x}Li_x)O_4$$

where $0 \leqq x \leqq 0.1$.

4. The lithium secondary battery according to claim 3, wherein $0 < x \leqq 0.1$.

5. The lithium secondary battery according to claim 2, wherein the spinel-structured lithium-manganese complex oxide is represented by the formula $$Li(Mn_{2-x-y}A_yLi_x)O_4$$

where $0 \leqq x+y \leqq 0.1$ and A is selected from the group consisting of Cr, Ni, Fe, Co and Mg.

6. The lithium secondary battery according to claim 2, wherein the electrolyte is a separator containing non-aqueous electrolytic solution or solid-state electrolyte.

7. The lithium secondary battery according to claim 1, wherein the spinel-structured lithium-manganese complex oxide is represented by the formula $$Li(Mn_{2-x}Li_x)O_4$$

where $0 \leqq x \leqq 0.1$.

8. The lithium secondary battery according to claim 7, wherein $0 < x \leqq 0.1$.

9. The lithium secondary battery according to claim 1, wherein the spinel-structured lithium-manganese complex oxide is represented by the formula $$Li(Mn_{2-x-y}A_yLi_x)O_4$$

where $0 \leqq x+y \leqq 0.1$ and A is selected from the group consisting of Cr, Ni, Fe, Co and Mg.

10. The lithium secondary battery according to claim 1, wherein the electrolyte is a separator containing non-aqueous electrolytic solution or solid-state electrolyte.

11. A lithium secondary battery comprising:

an anode comprising, as active material, lithium metal, lithium alloy or a material capable of absorbing and desorbing at least lithium ions;

a cathode comprising spinel-structured lithium-manganese complex oxide as an active material, the spinel-structured lithium-manganese complex oxide being in the form of hollow, spherical particles obtained by sintering single primary crystal particles of lithium manganese complex oxide; and an electrolyte.

12. The lithium secondary battery according to claim 11, wherein the single crystal particles have an average diameter of from about 70 to 500 nm.

13. The lithium secondary battery according to claim 11, wherein the spinel-structured lithium-manganese complex oxide is represented by the formula $$Li(Mn_{2-x}Li_x)O_4$$

where $0 \leqq x \leqq 0.1$.

14. The lithium secondary battery according to claim 13, wherein $0 < x \leqq 0.1$.

15. The lithium secondary battery according to claim 11, wherein the spinel-structured lithium-manganese complex oxide is represented by the formula $$Li(Mn_{2-x-y}A_yLi_x)O_4$$

where $0 \leqq x+y \leqq 0.1$ and A is selected from the group consisting of Cr, Ni, Fe, Co and Mg.

16. The lithium secondary battery according to claim 11, wherein the electrolyte is a separator containing non-aqueous electrolytic solution or solid-state electrolyte.

* * * * *